United States Patent

[11] 3,533,371

[72] Inventors Erich W. Gronemeyer
2100 S. Ocean Lane, Apt. 206, Fort Lauderdale, Florida 33316;
Louis F. Kutik, 5601 SW 56th St., Fort Lauderdale, Florida 33314
[21] Appl. No. 665,766
[22] Filed Sept. 6, 1967
[45] Patented Oct. 13, 1970

[54] DOSAGE TIME INDICATING DISPENSING CONTAINER
1 Claim, 11 Drawing Figs.

[52] U.S. Cl. .................................................. 116/121, 206/42
[51] Int. Cl. .................................................. B65d 85/56
[50] Field of Search .................................... 116/121, 133; 221/4, 79; 206/42; 220/60(Cursory); 223/23

[56] References Cited
UNITED STATES PATENTS

| | | | |
|---|---|---|---|
| 1,764,352 | 6/1930 | Sacerdote ..................... | 206/42X |
| 2,833,068 | 5/1958 | Parker .......................... | 116/121X |
| 2,943,730 | 7/1960 | Tregilgas ...................... | 221/4UX |
| 3,053,383 | 9/1962 | Kahn ............................ | 206/42 |
| 3,199,489 | 8/1965 | Ruoss et al .................. | 116/121UX |
| 3,227,127 | 1/1966 | Gayle ........................... | 116/133X |
| 3,261,455 | 7/1966 | Gayle et al. ................... | 206/42 |
| 3,302,775 | 2/1967 | Finkelston et al. ............ | 206/42 |
| 3,305,077 | 2/1967 | Greif et al. .................... | 206/42 |
| 3,348,731 | 10/1967 | Eicholtz et al ................ | 206/42X |
| 3,139,208 | 6/1964 | Irwin et al. .................... | 220/60X |
| 3,288,277 | 11/1966 | Hallerbach .................... | 206/42 |

Primary Examiner—Louis R. Prince
Assistant Examiner—Daniel M. Yasich
Attorney—Settle, Batchelder and Oltman ABSTRACT: A container from which medication dosages or the like are dispensed in closely regulated sequence and amount. The container includes a package having a plurality of peripherally spaced, open-topped, pockets joined to one another by a central web, the pockets being initially closed by closures which serve to retain individual medication portions therein. An indicator or a card is secured to the package means for movement relative thereto, and the package and the indicator have cooperable indicia which (1) locate and identify the pocket containing the initial dosage portion and (2) orient the pockets for the sequential subsequent dispensing of the dosage portions remaining in the still closed pockets. The opening of each of the closures, in turn, not only affords access to the remainder of the dosage portions in the proper sequence but gives an indication of consumption of each such portion.

Patented Oct. 13, 1970

INVENTORS
ERICH W. GRONEMEYER.
LOUIS F. KUTIK.
BY
WILSON, SETTLE & BATCHELDER.
ATT'YS.

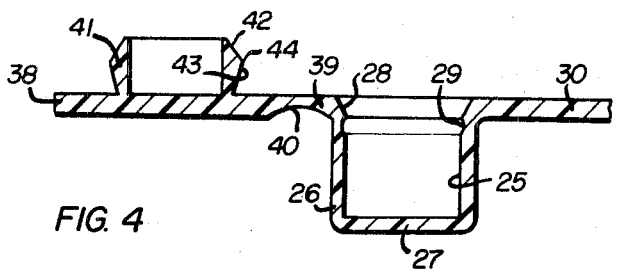
FIG. 4
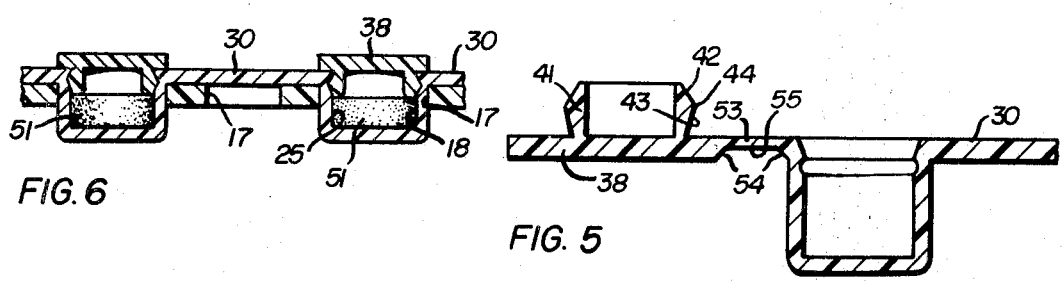
FIG. 6
FIG. 5
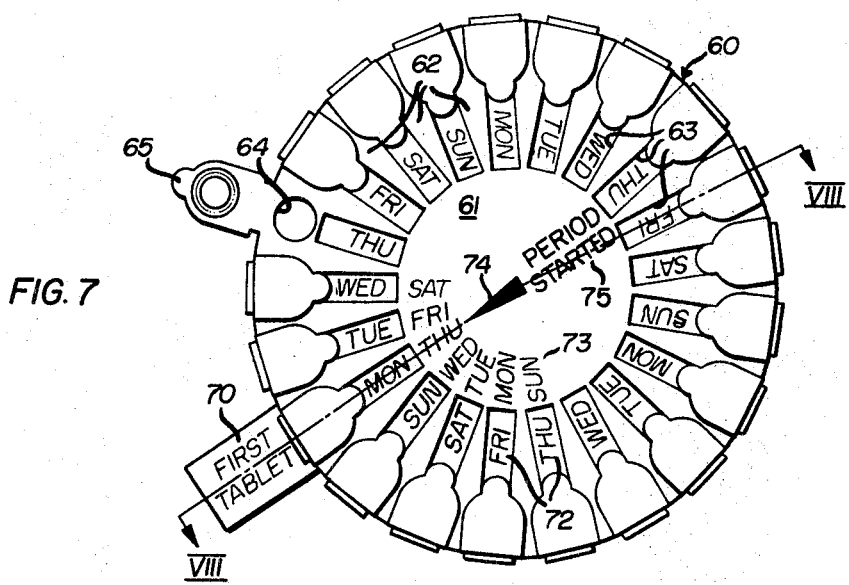
FIG. 7
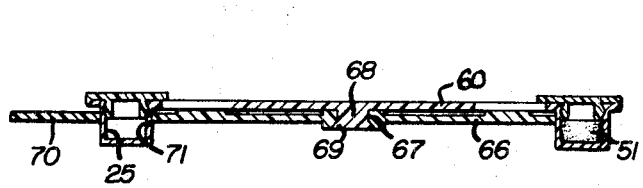
FIG. 8
INVENTORS
ERICH W. GRONEMEYER.
LOUIS F. KUTIK.
BY WILSON, SETTLE & BATCHELDER.
ATT'YS.

INVENTORS
ERICH W. GRONEMEYER.
LOUIS F. KUTIK.
BY
WILSON, SETTLE & BATCHELDER.
ATT'YS.

DOSAGE TIME INDICATING DISPENSING CONTAINER

BACKGROUND OF THE INVENTION

The present invention relates to a dispensing container and, more particularly, to such a container for the dispensing of material portions, e.g. doses of medicine, in predetermined sequences and amounts.

A patient taking certain types or kinds of medication, for example, women taking birth control pills, must take the medication in predetermined daily dosages, initial dosage being taken at a prescribed time after the happening of a related event, for example the onset of a menstrual period, and the medication must continue for a predetermined period of time, for example for 20 days, and at a predetermined daily dosage.

Various types of dispensing containers have been proposed for use with such birth control pills. A typical such container provides a pair of interconnected dials joined through a small gear. Each day, one of the dials is advanced one space and the pill is then removed from a recess which becomes aligned with an opening. This type of container suffers several disadvantages, since there is no indication of the date on which the initial dosage is to be taken, the dispensing mechanism must be indexed exactly one space each time a pill is taken, the relative movement of the pill-containing recess in the one dial and the opening in the other dial can become jammed or an accidentally dislodged pill can become crushed, and there is no indication that a previous pill has been taken other than the fact that an empty recess exists in that portion of the second dial which is aligned with the dispensing opening.

Other various pill counting and dispensing mechanisms have been proposed but all such mechanisms have been complex, expensive, difficult to manipulate, and imperfect in their indication of the location and indication of the initial dosage and the orienting of the remaining doses to be dispensed in sequence.

The present invention now provides a new and improved dispensing container which is extremely simple in design, construction and function, which accurately indicates the time of the initial dosage with reference to a previous event, which gives a positive indication of the next dosage to be taken in sequence and which also gives a positive indication that the next previous dosage has been taken.

Structurally, the present invention comprises two parts, a container part or a "package means" and an indicating part or "indicator card". The two parts are provided with cooperating indicia which specifically locate and identify the initial dosage and the two parts are relatively movable to orient the sequential dosages for subsequent dispensing in the proper order and amount.

Basically, the container part comprises a plurality of separate, peripherally spaced, open-topped dosage pockets which are interconnected by a supporting structure and which are to be immovable with respect to one another. Each pocket is provided with a closure means of which the dosage is confined in the pocket, this closure being movable relative to the pocket to both expose the dosage for consumption and to indicate that the dosage of the pocket has been consumed.

The indicator part may well comprise a card or a similar planar piece of paper or plastic which is adapted to be secured to the container part but which is, at least initially, movable relative thereto. Preferably, the container part and the indicator part are relatively movable about a common center, and the indicator part engages at least one of the said pockets at a location remote from the pocket closure to secure the indicator part and the container part to one another in relatively rigid assembly after the first movement to determine dosage has been made.

Thus, it is not necessary that the two parts be indexed for each dosage, and there is no possibility of either forgetting to move the two parts to make the next dosage available or of moving the parts to an extent such that the dosage is not available or cannot be dispensed.

The nature of the indicia on the two parts of the dispensing container is dependent upon the type of material to be dispensed. In the case of birth control pills, the indicia might well include a first directional arrow on the package part directed at a window or opening formed therein, so that the lower indicating part is visible therethrough. This first directional arrow is identified as "Period Started". A second directional arrow labeled "First Tablet" or "Take First Tablet" points to a first pill pocket which preferably is labeled with a day of the month, either on the card or the closure. The day of the week visible through the container window and indicated by the first arrow is precisely 4 days prior to the day of the week indicated by the second directional arrow.

Thus, if the patient's period started on Thursday, the card moved relative to the container until "Thursday" appears in the window, the second arrow then will point to a pocket designated "Monday". On Monday, the patient opens the closure of the indicated pill pocket and takes the indicated pill. The closure is then either physically removed by tearing it from the remainder of the container or is merely left in its open position, thereby giving a ready indication that the initial pill has been taken. The remainder of the pill pockets are identified by successive days of the week and the patient merely needs to glance at the dispensing container and relate the indicia adjacent the first not-yet-dispensed pill to the current day of the week to determine whether or not the pill has been taken for that day.

Thus, the present invention has, as one object, the provision of a dispensing container which is initially set in an adjusted postion indicating that date on which an initial pill or dosage is to be taken and having closures which provide a simple, foolproof indication, either by virtue of their being open or by virtue of their being bodily removed, that the pill or dosage for each successive day has been taken.

Another important object of the present invention is to provide an improved dispensing container wherein pills or other dosage materials are retained in closed pockets identified in sequence, the closures of each successive pockets being openable to make the contents of that pocket available and to make readily apparent the fact that a specific pill for a specific date has or has not been taken.

Yet another object of this invention is the provision of an improved dispensing container consisting of initially relatively movable container and indicator parts which are initially moved relative to one another to orient the material pockets relative to indicia on the two parts, the two parts then being fixed relative to one another, so the contents can then be dispensed at a proper initial dispensing date and at subsequent sequential dispensing dates.

Still another, and no less important, object of the present invention is the provision of a dispensing container particularly adapted for the dispensing of medication on a critical initial date and at regular subsequent intervals, the container positively identifying a specific dosage to be dispensed on a specific first date and orienting subsequent dosages for consumption on subsequent specific dates.

Other objects of this invention will appear in the following description and appended claims, reference being had to the accompanying drawings forming a part of this specification wherein like reference characters designate corresponding parts in the several views.

ON THE DRAWINGS

FIG. 4 is an enlarged sectional view taken along the plane 4—4 of FIG. 3 and illustrating in detail the hinge construction interconnecting a material pocket and a closure therefor;

FIG. 5 is an enlarged sectional view identical with FIG. 4 but illustrating a different form of hinge construction;

FIG. 6 is an enlarged sectional view taken along the plane 6–6 of FIG. 1;

FIG. 7 is a plan view similar to FIG. 1 but illustrating a modified form of dispensing containers;

FIG. 8 is a sectional view taken along the plane 8–8 of FIG. 7;

AS SHOWN ON THE DRAWINGS

Figure 1:
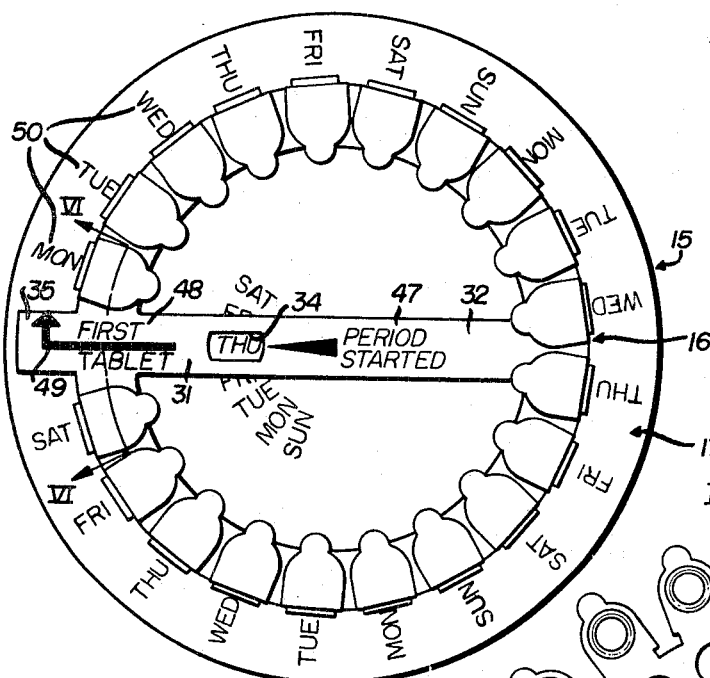
FIG. 1 is a plan view of a dispensing container of the present invention.

In FIG. 1, reference numeral 15 refers generally to a dispensing container of the present invention, comprising separate, relatively movable, interconnected package means 16 and indicating means 17.

Figure 2:
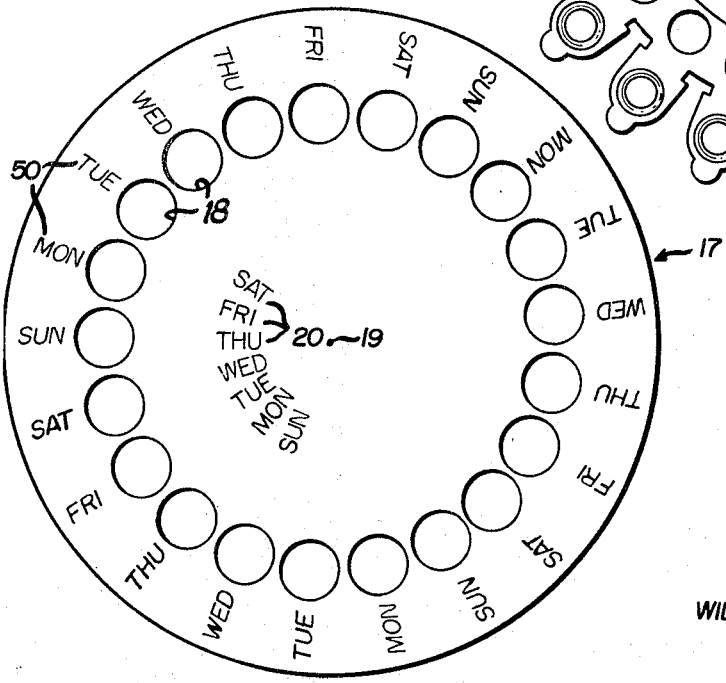
FIG. 2 is a plan view of the indicator part for the dispensing container of FIG. 1.

As illustrated in detail in FIG. 2 of the drawings, and as particularly adapted for the dispensing of birth control tablets which must be taken in a series of 20 pills starting on the fourth day after the onset of a menstrual period, the indicating part 17 comprises a planar, circular card formed of paper board, plastic, or the like material having 21 circular apertures ranged in an arcuate or circular array about a center 19. Also concentric with the center 19 are radially disposed groups of indicia 20 representing the days of the week, the day identification being radially aligned with individual and specific apertures 18.

The package part 16 comprises injection molded parts having a plurality of separate, peripherally spaced, open-topped dosage pockets 25 located generally beneath the main plane of the article and of generally cylindrical configuration, each such pocket having a cylindrical side wall circumscribing the pocket and a lower bottom wall 27 (FIG. 4) closing the lower end of the pocket. The upper open end of the pocket is chamfered, as at 28 for easy entry of a tablet, pill or other dosage unit, and the upper portion of the inner periphery of the side walls 26 is provided with an annular locking groove 29. Adjacent pockets 25 are interconnected by intermediate wall portions 30 and a pair of radial arms 31, 32 (which may alternately be considered as one arm) project radially of a central circular aperture 33. The arm 31 is provided with a generally rectangular window 34 for a reason to be hereinafter more fully described. The arm 31 also projects radially outwardly beyond the joining portions 30 to define an actuating tab and indicia area 35.

The joining portions 30 are also provided with hinged closures 37 specifically illustrated in FIG. 4 of the drawings. Each such hinged closure comprises a planar closure plate or panel 38 joined to the portion 30 in radially alignment with one of the portion pockets 25 by means of a reduced thickness hinge portion 39, this hinge portion 39 being defined by an arcuate groove 40 in its under surface. The arm 38 carries an upstanding annular wall 41 having tapered outer surfaces 42, 43 which merge into an annular locking projection or edge 44 of increased diameter.

Upon deflection of the disclosure tab or wall 38 toward the pocket 25, flexure in the hinge portion 39 will be localized at the recess 40, and this groove 40 which projects across the entire width of the tab 38 will bend smoothly to an arcuate configuration, so that the locking wall 41 registers exactly with the pocket 25. After such registry is established, further depression of the wall 38 will insert the wall 41 into the pocket until such time as the radially enlarged annular projection 44 engages in the annular pocket wall recess 26. Thus, a snap connection is provided with the closure plate 38 overlying and secured to the pocket 25 as illustrated in FIG. 6.

Figure 3:
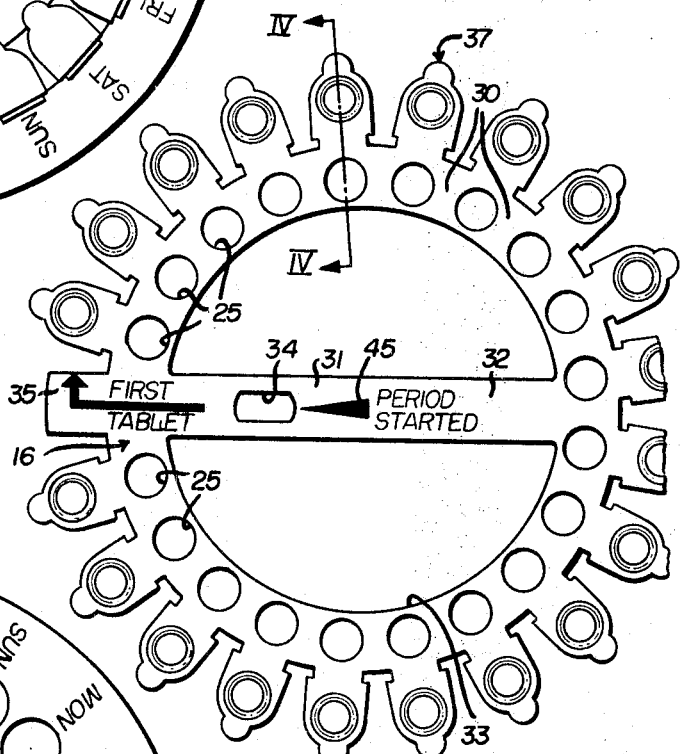
FIG. 3 is a plan view of the package means for the dispensing container of FIG. 1 in an adjusted position different from the condition of FIG. 1.

As will be readily seen from comparison of FIGS. 2 and 3 of the drawings, the pockets 25 in the part 16 register with the apertures 18 in the part 17 when the part 16 is superimposed on the part 17, the pocket walls 26 surrounding the pockets 25 snugly fitting into the apertures 18, as indicated in FIG. 6 of the drawings, and the pockets being concentric with the geometric center 45 of the part 16. When the parts 16 and 17 are assembled, the geometric centers 45 and 19, respectively, of the parts are in registry. It will be noted that the part 17 has 21 apertures while the part 16 has 20 pockets 25. The one aperture 18, which is not filled by a pocket 25 upon assembly of the parts, underlies the radial arm 31 and the extension 35 thereof.

The indicia 20 on the part 17 is visible through the window 34 formed in the arm 31, and the two parts are relatively rotated prior to assembly until the proper indicia or day of the week 20 (e.g. the day upon which the period started) is in registry with the window 34. To insure such registry and to indicate the initial day upon which the first pill is to be taken, the radial arms 31 and 32 bear indicia 47 "Period Started" and indicia 48 reading "First Tablet" with an adjacent directional arrow 49 pointing to the pocket next adjacent the extension 35 in a clockwise direction. The part 17 bears additional indicia 50 radially outwardly of the apertures 18 indicating successive days of the week, and this indicia is arranged such that the directional arrow 49 indicates a day of the week 50, 4 days later than that day of the week indicated by the indicia 20 and visible through the window 34.

Thus, it is merely necessary for the patient to set the two relatively movable parts 16, 17 by relatively rotating the same until the proper day of the week upon which the period started appears in the window 34. Next, the two parts 16, 17 are pressed together to affix the pockets 25 in the apertures 18 and, on the next successive day of the week indicated by the reference numeral 49 and forming a part of the indicia 50, the patient opens the closure flap 38 uncovering the first pocket 25 and removes the pill or tablet 51 contained therein.

The closure flap 38 is either left open, as indicated in FIGS. 3 and 4 or is merely twisted to rupture the wall 38 at the location of the recess 40, while the remainder of the closure flaps 38 remain closed. Thus, the fact that the pill indicated in FIG. 1 to be taken on the first Monday following the Thursday on which the period started will be readily apparent to the user, due to the open or missing closure flap 38.

Alternatively, the part 16 may be made of a transparent or translucent plastic, so that the pills 51 remaining in the other pockets 25 and the absence of a pill in the first pocket 25 will be readily apparent visually. On the next successive day, the user merely glances at the dispensing container to see that there is a pill still in the container for that day (Tuesday); and the user merely repeats the opening of the closure flap 38, the removal of the pill, and the leaving of the flap open or the tearing of the flap from the remainder of the package or the reclosing of the transparent flap as desired.

In this same sequential manner, the remainder of the 20 pills contained in the dispensing container are taken and, when all of the pills are gone, the user than knows that she has completed a complete cycle of 20 pills.

In FIG. 5 of the drawings a modified form of hinge for the closure flap 38 is illustrated, this form of closure flap being joined to the remainder of the part 16 by reduced hinge section 53 defined by upwardly convergent or canted side walls 54 and a medial wall 55. The same advantages of definite hinge location, accurate registry between the hinge flap wall 41 and the recess or pocket 25 and ready removal of the tab upon twisting, if desired, are obtained by this type of hinge construction. Actually, during the formation of the part 16 by the injection molding of a plasticized plastic material or the like, the flow of the plastic material, such as polystyrene, polyethlene or the like radially outwardly from the relatively heavy section 30 through the restricted passage afforded by the relatively thin hinge wall 53 and into the relatively thick flap wall 38 will serve to orient the crystalline structure of the plastic material, so that an amazingly easy removal of the flap 38 can be effected by twisting. At the same time, this crystalline structure does not interfere with normal operation of the hinge structure upon repeated opening and closing of the closure about the hinge wall 53, nor can the hinge be easily ruptured without twisting.

In that embodiment of the invention shown in FIGS. 7 and 8, an even more simple construction is provided. Here, reference numeral 60 refers generally to a dispensing container of the present invention including a circular center portion 61 having integral radially extending arms 62 defined between apertures or windows 63 and aligned with pockets 64 identical with the pockets heretofore described, each such pocket 64 being supplied with a closure 65 also the type heretofore described and illustrated in FIG. 4, 5, and 6. The container 60 may be transparent or translucent. The indicator part, as best illustrated in FIG. 8, is a flat disk 66 having a central aperture 67 receiving therethrough a depending pivot post 68 integrally formed with and projecting from the under surface of the part 60, the post having its lower extremity radially outwardly flared or riveted, as at 69, to assemble the parts 66 and 60 into assembly. The outer diameter of the card or disk 66 is such that the exterior periphery of the disk merely contacts the inner extremities of the pocket side walls 26. The disk 66 is provided with a single, radially projecting tab 70 which extends radially outwardly beyond the confines of the part 60, as best shown in FIG. 7, and this tab is provided with a single aperature 71 of a size to receive therein one of the pockets 25.

It will be readily appreciated that upon deflecting the tab 70 downwardly to remove the pocket 25 from the aperture 71, the two parts 60 and 66 can be relatively rotated relative to one another about the pivot post 68 and, upon insertion of the pocket 25 into the aperture 71, the two parts are assembled against relative rotation. If desired, the disk 66 can be made of paper, and the tab 70 can be reinforced with tape or formed of double thickness, or the like.

The disk 66 is provided with indicia 72 constituting the successive days of the week, which indicia is readily visible through the windows 63 formed in the part 60. The part 66 is also provided with indicia 73 again denoting the days of the week and offset from the indicia 72 as heretofore described in connection with the embodiment of FIGS. 1 through 6. The indicia 73 is readily visible through the central web portion 61 of the part 60 if the part 60 is made of clear plastic material. Alternatively, the web 61 may be removed or provided with windows through which the indicia 73 will be visible. The web 61 or other parts of the part 60 is provided with a directional arrow 74 and appropriate indicia 75 to indicate the initial starting date or the date on which "Period Started".

The operation of the embodiment of FIG. 7 and 8 is substantially the same as the operation of the embodiment of FIGS. 1 through 6, with the parts being relatively rotated into the proper and desired rotational orientation, following which the parts are secured together for subsequent utilization by means of the aperture 71 of the tab 70 and the appropriate one of the recesses or pockets 25.

Figure 9:
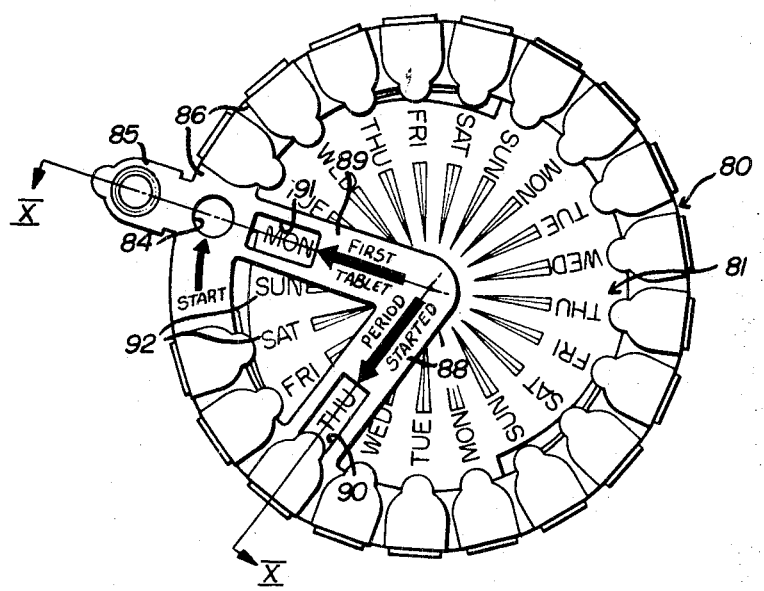
FIG. 9 is an elevational view similar to FIGS. 1 and 7 and illustrating a different form of dispensing containers.
Figure 10:
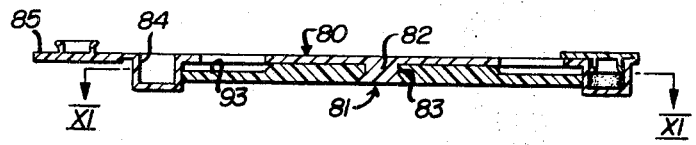
FIG. 10 is a sectional view taken along the plane 10–10 of FIG. 9.

In that embodiment of the invention illustrated in FIGS. 9 through 11, the dispensing container consists of a package part 80 and an indicator part 81, both of which are preferably formed of injection molded thermoplastic material and which are secured together for relative rotation by means of a center post 82 formed on the part 80 and riveted into a recess 83 formed in the part 81 in the manner heretofore described in connection with that embodiment of FIGS. 7 and 8. The package part 80 may be opaque, translucent or transparent as desired.

The part 80 is provided with recesses or pockets 84 and hinged closure flaps 85 identical with the same elements as described in connection with the previous embodiments of the present invention. The pockets 84 are joined to one another by peripheral joining portions 86 intermediate the adjacent pockets and by radially extending arms 89 and 88. The arms 89 and 88 are provided with windows or apertures 91 and 90, respectively, through which are visible indicia 92 printed or embossed on the upper surface 93 of the lower member 81. It will be noted from FIG. 10 that the upper surface 93 of the element 81 bearing the indicia 92 is downwardly recessed so as to be spaced from the under surface of the member 80, thereby avoiding any frictional contact which might scrub the indicia from the surface 93.

Figure 11:
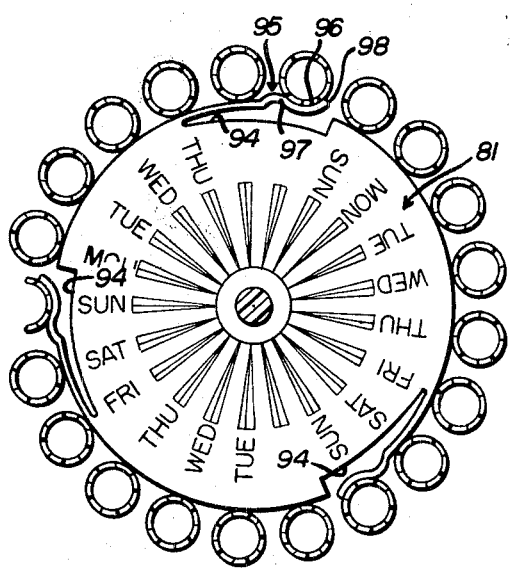
FIG. 11 is a sectional view taken along the plane 11–11 of FIG. 10.

The lower element 81, as specifically illustrated in FIG 11, is circular in overall configuration and is provided at its peripheral extremity with three recesses or notches 94. Spring arms 95 are formed integrally with the disk 81 and directly overlie the notches 94, the spring arms 95 projecting radially outwardly from the disk 81 and being provided with peripheral recesses 96 adapted to snugly abut an appreciable radial extent of the adjacent wall of the appropriate pocket 84. Each arm 95 is provided with a medial bent portion 97 and with a free extremity 98. The recess 97 located medially of each of the arms 95 will accomodate counterclockwise rotation of the part 81 relative to the part 80, while the free end 98 of each arm 95 will abut the exterior peripheral wall of the next adjacent recess or pocket, thereby preventing, or at least inhibiting, clockwise rotation of the part 81 relative to the part 80.

Consequently, the user merely turns the part 81 relative to the part 80 in a counterclockwise direction until the day of the week upon which the period started appears in the window 90. When the day arrives which is indicated in the window 91, the first tablet is taken by moving the closure flap 85 from its normal closed position to its opened position as indicated in FIG. 9 of the drawings. After the initial first setting of the parts 80 and 81 by relative rotation, the parts are not further moved relative to one another, and the pockets 84 are merely opened in sequence.

From the foregoing detailed description it will readily be seen that the present invention provides a novel dispensing container which consists of two relatively movable parts which are moved relative to one another to an initial setting and which are then retained in this initial setting with successive doses being indicated in sequence and at the desired intervals by indicia carried by one of the elements. Further, the elements carry cooperating indicia which indicate the date upon which the initial dosage is to be taken and further indicating the specific location of the initial dosage, so that the remaining doses can be taken in sequence.

Additionally, a novel closure means is provided whereby individual doses are retained in position until such time as they shall be taken in their proper sequence. At this time, the closure is simply opened to afford access to the required dosage and left open to afford an indication of the fact that the specific dosage has actually been taken. If desired by the user, the closure may be readily removed from its assembly with the remainder of the apparatus by simple twisting motion, to yield a further indication that the required dosage has been taken.

The complete dispensing container herein proposed does not require any manipulation to dispense any periodically required dosage other than the mere opening of a closure element. Thus, there is no danger of the user disturbing the predetermined setting, and there is no danger of the user either skipping a dose or taking two doses on the same date. The improved reliability of the present container thus will be readily appreciated.

We claim:

1. In a dispenser for holding medication to be dispensed in discrete dosages at regular intervals and having a container part comprising a plurality of pockets, a web interconnecting said pockets, and a plurality of covers for opening and closing said pockets respectively, the improvements wherein said web is circular and planar in configuration, said pockets are formed integrally in said web in a circular array and are spaced serially adjacent a circular rim of said web, said covers are connected to said rim adjacent respective ones of said pockets by hinge straps normally projecting radially outward from said rim with said covers located at ends thereof, each of said hinge straps having a groove therein extending transversely thereof parallel to a tangent of said rim which makes said hinge strap bendable manually to allow each cover to swing accurately into position over the corresponding pocket to close that pocket, interengaging portions of each cover and pocket sealing that pocket when the cover is closed, said grooves being sufficiently deep to render the hinge material at the groove rupturable manually so that the cover can be removed by a twisting motion, said covers, pockets, web and hinges all being formed integrally as one piece of plastic material with said hinges being oriented plastic to facilitate bending for closing and rupture by twisting thereof, and a generally planar indicator card combined with said one-piece container part, said indicator card being movable relative to said pockets and having means engageable with at least one of said pockets to relatively fix the card and pockets in any one of several adjusted positions, said container part and said indicator card having cooperating indicia thereon (a) for identifying a specific pocket with respect to an initial reference time, and (b) for indicating successive additional pockets to be opened after said reference time.